United States Patent
Gautier et al.

(10) Patent No.: US 12,224,910 B2
(45) Date of Patent: Feb. 11, 2025

(54) SELF-DISCOVERY NETWORK OF LINEAR SENSORS

(71) Applicant: TTK, Paris (FR)

(72) Inventors: Olivier Gautier, Paris (FR); Olivier Gillot, Paris (FR)

(73) Assignee: TTK, Paris (FR)

( * ) Notice: Subject to any disclaimer, the term of this patent is extended or adjusted under 35 U.S.C. 154(b) by 0 days.

(21) Appl. No.: 18/294,869

(22) PCT Filed: Jun. 13, 2023

(86) PCT No.: PCT/EP2023/065854
§ 371 (c)(1),
(2) Date: Feb. 2, 2024

(87) PCT Pub. No.: WO2023/242219
PCT Pub. Date: Dec. 21, 2023

(65) Prior Publication Data
US 2024/0275685 A1 Aug. 15, 2024

(30) Foreign Application Priority Data
Jun. 16, 2022 (FR) .................................. FR2205912

(51) Int. Cl.
*G01D 21/00* (2006.01)
*H04L 41/12* (2022.01)

(52) U.S. Cl.
CPC ............ *H04L 41/12* (2013.01); *G01D 21/00* (2013.01)

(58) Field of Classification Search
CPC . H04L 41/12; H04L 41/0853; H04L 41/0893; H04L 12/403; G01D 21/00;
(Continued)

(56) References Cited

U.S. PATENT DOCUMENTS

2005/0278566 A1* 12/2005 Jones ................... G06F 11/006
714/E11.019
2008/0155073 A1* 6/2008 Swain ................... H04L 12/403
709/251
(Continued)

FOREIGN PATENT DOCUMENTS

| CN | 109839437 A | * | 6/2019 | ............ G01N 29/04 |
| CN | 113904893 A | | 1/2022 | |
| EP | 1465541 B1 | * | 12/2007 | ............ A61B 34/20 |

OTHER PUBLICATIONS

Written Opinion and Search Report dated Dec. 21, 2023 for PCT Application No. PCT/EP2023/065854.

*Primary Examiner* — Jeffrey P Aiello
(74) *Attorney, Agent, or Firm* — Greer, Burns & Crain, Ltd

(57) ABSTRACT

A method for self-discovery of an array of linear sensors, wherein each linear sensor has a unique identifier, the method includes: for each accessory, identifying a linear sensor situated upstream or downstream of the linear sensor; sending a local request to the identified sensor/accessory; sending a general request to the plurality of linear sensors and/or accessories in the array; receiving a response to the at least one local request by said linear sensor and/or the accessory; sending a response to the general request by said linear sensor and/or by the accessory, the response to the general request sent by the linear sensor comprising the unique identifier; and processing the response to the general request received from each linear sensor and/or from each accessory by the central processing unit allowing to reconstitute the logical topology of the network as a function of the unique identifiers received.

10 Claims, 2 Drawing Sheets

(58) Field of Classification Search
CPC .............. G01D 18/00; G01D 2218/10; G01D 5/34746; G01P 21/025; G01P 21/00; G01B 7/023
USPC .............. 73/1.88, 1.79, 579; 324/207.2, 601, 324/207.24; 700/258, 282, 275, 302; 702/188, 150, 104, 86, 45, 127, 185, 100, 702/94, 50, 155, 182, 158, 35, 85, 33, 702/183
See application file for complete search history.

(56) References Cited

U.S. PATENT DOCUMENTS

| | | | |
|---|---|---|---|
| 2016/0089057 A1* | 3/2016 | Jia .......................... | A61B 5/053 600/424 |
| 2018/0020920 A1* | 1/2018 | Ermilov ............. | A61B 5/14546 600/317 |

* cited by examiner

[Fig. 1]
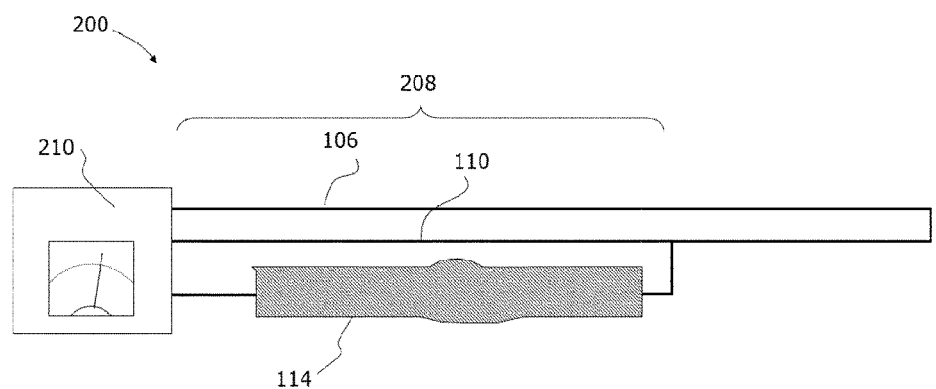
[Fig. 2]
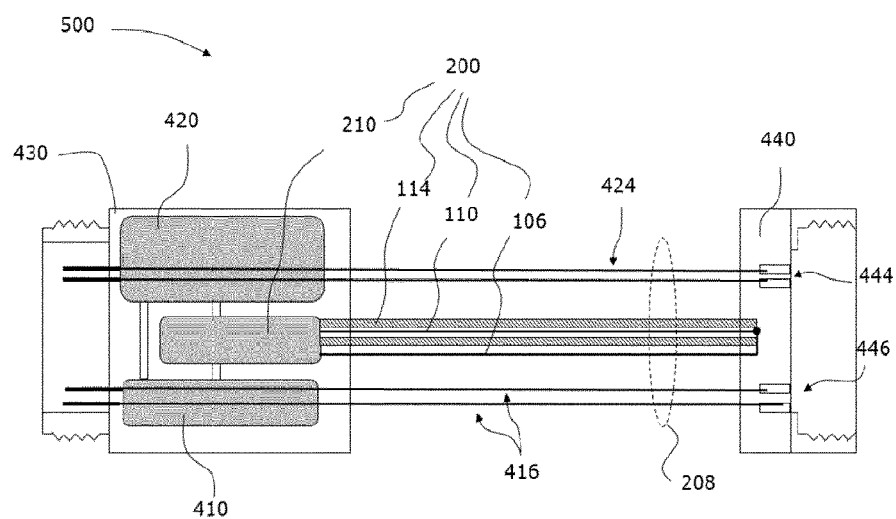

[Fig. 3]
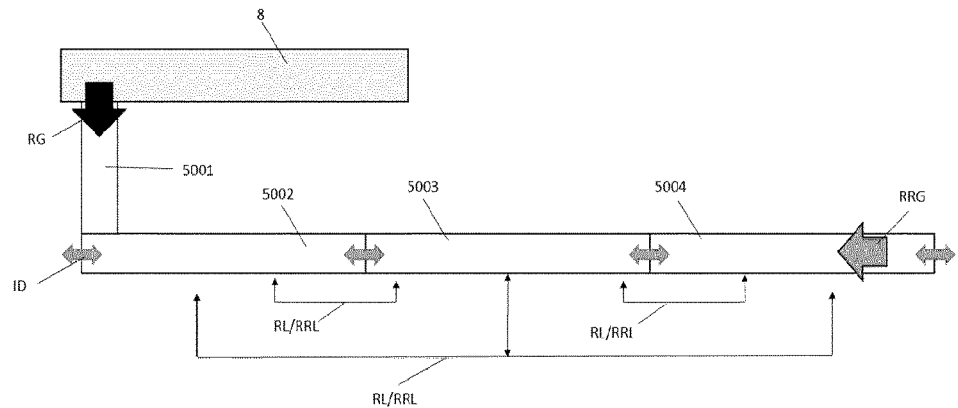
[Fig. 4]
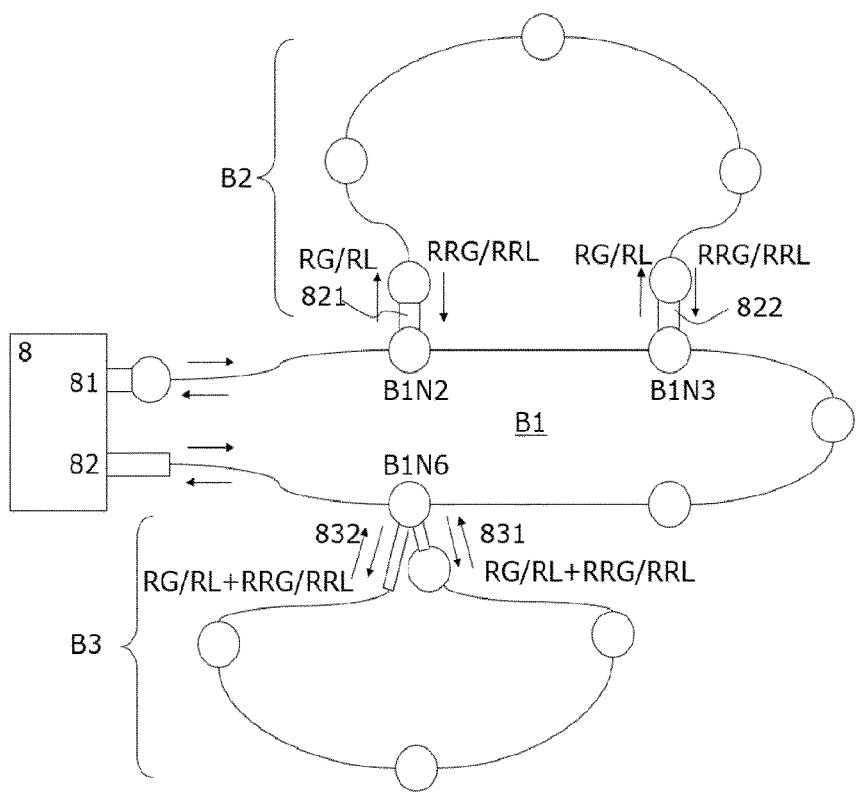

SELF-DISCOVERY NETWORK OF LINEAR SENSORS

BACKGROUND

The present invention relates to a self-discovery method for a network of linear sensors. It also relates to a linear sensor allowing self-discovery of the network of linear sensors.

In order to detect leaks of liquid over great lengths such as oil pipelines or water mains or over large surface areas such as industrial sites or data centres, it is known to install linear sensors connected together in series to form a detection line.

In such a detection line, each linear sensor comprises an elongated portion that includes over all or part of its length a means sensitive to the liquid(s) to be detected. The linear sensors also comprise in their elongated portion a communication bus, these being connected together to form an interrogation bus extending the entire length of the detection line. The end of the detection line is connected to a central processing unit.

During interrogation on the part of the central processing unit, the linear sensors respond one after another in the order in which they are connected: the first intercepts the interrogation and responds to it, then short-circuits itself so that the next signal reaches the following linear detector; and so on and so forth to the end of the chain.

Currently, the central processing unit identifies the linear sensors in chronological order of their responses, and deduces therefrom the topology of the linear sensors, which it stores in its memory.

In the new technology, the linear sensors are more intelligent and their responses are enriched with new data.

The purpose of the present invention is to allow the network to perform a self-discovery thereof without intervention by the user.

Another purpose of the present invention is to render the network tolerant of configuration changes that could take place during operation in an unexpected manner or without warning.

SUMMARY

This purpose is achieved with a self-discovery method for a network of linear sensors, the network comprising a central processing unit and a plurality of linear sensors each comprising a first end and a second end and which are connected together to form a detection line, which is connected to said central processing unit by at least one end of said detection line, the network also comprising at least one accessory, said accessory comprising at least one output allowing to connect a linear sensor by means of one of the ends of said linear sensor.

According to the invention, each linear sensor and/or accessory is characterized by a unique identifier and in that the method comprises at least the following steps:

for each linear sensor and/or accessory:
  identifying at least one linear sensor situated upstream and/or downstream of the linear sensor and/or of the accessory, the at least one upstream and/or downstream linear sensor being considered as identified if one of its ends is connected to one of the ends of said linear sensor and/or to the at least one output of the accessory,
  sending at least one local request to the at least one linear sensor identified by said linear sensor and/or by the accessory,
  sending at least one general request by the central processing unit to the plurality of linear sensors and/or accessories of the network,
  receiving at least one response to the at least one local request by said linear sensor and/or the accessory, the response being composed of the unique identifier of the at least one linear sensor identified by said linear sensor and/or the accessory,
  sending at least one response to the general request by said linear sensor and/or by the accessory, the response to the at least one general request sent by the linear sensor comprising the unique identifier of the at least one linear sensor identified by said linear sensor as well as the unique identifier of said linear sensor, and/or, the response to the at least one general request sent by the accessory comprising the unique identifier of the at least one linear sensor identified by said accessory as well as the unique identifier of said accessory,
  processing the at least one response to the general request received from each linear sensor and/or from each accessory by the central processing unit allowing to reconstitute the logical topology of the network as a function of the unique identifiers received.

One of the advantages of the method according to the invention is to allow the central processing unit to define how many linear sensors and accessories are present in the network and where each linear sensor and each accessory is situated in the network. The central processing unit then makes it possible to reconstitute the logical topology of the entire network of linear sensors as a function of the unique identifiers received.

Advantageously, the accessory can correspond to a junction block and/or an end stop and/or a neutral cable.

By "junction block" is meant an element that allows at least a second element to be added, typically a linear sensor.

By "end stop" is meant an end-of-line element indicating the end of serial cabling of linear sensors so as to distinguish it from a break or discontinuity of the linear sensor.

By "neutral cable" is meant a cable that allows to connect two remote sensors/junction blocks without adding functionality.

By "element" is meant either a junction block, an end stop, or a neutral cable. The accessories are not limited to the list given above.

Several types of junction blocks exist such as for example straight junction, loop junction and/or length junction block.

By "straight junction block" is meant a junction block that allows the addition as a branch of linear sensors and accessories in serial without return.

By "loop junction block" is meant a junction block that allows the addition as a loop branch of linear sensors and/or accessories (cabling with return to the junction block).

By "length junction block" is meant a junction block that allows the addition as a branch of a linear sensor the length of which is not predefined, in serial without return. This accessory makes it possible to integrate into the system linear sensors the length of which is not defined in advance. The junction block then measures the length of the linear sensor. The junction block sends the information to the central processing unit.

These accessories allow to create unique systems or networks adapted to the detection zone. The network is then modular according to need.

A further advantage of the invention is to allow the central processing unit to know if "linear sensor loops" are present in the network by means of the junction blocks or to define the end of a detection line formed by a series of linear sensors terminating by an end stop. The central processing unit is also configured to define how many linear sensors constitute a loop of linear sensors within the network.

The network is thus capable of "self-discovery", which greatly simplifies the installation of said network and renders it tolerant of configuration changes that could take place during operation in an unexpected manner or without warning.

For example, in the event of a problem with one of the linear sensors, the central processing unit is capable of directly identifying the linear sensor in question and informing the user of this in order for its maintenance to be directly carried out. This facilitates the replacement of said linear sensor causing a problem and makes is possible to optimize the maintenance of the network. No handling or test by the user is necessary in order to carry out said maintenance, by virtue of identification by the central processing unit.

Advantageously, the central processing unit is configured to update the linear sensors as well as the accessories constituting the network.

The at least one response to the local request and the at least one response to the general request can also comprise specific data items pertaining to each linear sensor and/or accessory.

The specific data items can comprise at least one of the following data items:
 a date of commissioning of the linear sensor,
 the type of linear sensor,
 a length of the linear sensor,
 a resistance of the loops internal to the linear sensor,
 a pollution level,
 an alarm state,
 a power supply level.

The specific data items make it possible to return to the user data pertaining to each linear sensor and/or accessory. The specific data items are advantageously sent to the central processing unit in the form of raw data. This then makes it possible to process each of the raw values received by the central processing unit according to the needs or features of the linear sensor or of an accessory in question without the need for programming these choices in advance by the user in the central processing unit.

By virtue of the specific data items, the central processing unit can advantageously manage the organisation of the network and for example define what type of linear sensor is concerned or define their audit log. It can also define what accessory is concerned. In addition, the specific data items make it possible to maintain correct operation of the network but also make it possible to ensure reliability of the geographical attribution of the responses received by the central processing unit.

In a preferred embodiment, a general request is sent so as to return to the central processing unit each unique identifier as well as one or more specific data items at the same time.

Advantageously, several general requests can be sent by the central processing unit. In fact, the central processing unit sends the general requests as a function of the responses that it needs. The responses that the central processing unit receives are adapted as a function of the type of general request sent. Depending on the type of general request sent, a general request can then contain a specific data item or several specific data items in response thereto. For example, when the first general request is sent over the network, the central processing unit receives the unique identifier of each element of the network, in this case a single data item is collected. By "first general request" is meant the general request sent initially in order to scan the network. This makes it possible for the central processing unit to constitute the topological basis of the network. By virtue of the list of unique identifiers that it constitutes by means of the responses received, it can then enrich the architecture of this base topology by addressing each element directly. In effect, by sending a second general request, the central processing unit can then "organise" the architecture, for example by receiving in response to said second general request the type of element that responds and/or what element is connected to said responding element. In this case, the response to the general request can comprise several specific data items. Reconstruction of the topology of the network and its organisation by the central processing unit therefore depends on the different responses received by the central processing unit in response to the general requests sent.

Advantageously, as a function of the specific data items sent to the central processing unit, the central processing unit can configure a sensitivity level of the network. The sensitivity level can be set overall, or individually on each element.

Each linear sensor and/or accessory can comprise a power supply module, and the method can also comprise the following steps:
 if a power supply level of the power supply module of a linear sensor and/or accessory is below a determined threshold, an alert is sent to the central processing unit.

The advantage of determining the power supply level of a liner sensor and/or of an accessory is knowing if the general power supply level of the network is stable and above a threshold determined beforehand. When the power supply level falls below the predetermined threshold, an alert state is sent during the transmission of specific data items by the linear sensor in question to the central processing unit. The user can then determine if there is a need to add an external power supply in order to stabilize the power supply level of the network. In another embodiment, the linear sensor can also send an alert state of its own motion, without a prior request being sent.

The method can also comprise the following steps:
 identifying the linear sensor in alarm state on the basis of the specific data items received by the central processing unit during the response to the general request.

The method according to the invention makes it possible to locate the linear sensor in alarm state. In fact, once the central processing unit has identified all of the elements constituting the network, it is configured to identify the element that returned an alarm state data item. The fact of returning this data item makes it possible for the user to define or position the external power supplies in the optimum possible way, i.e. as a function of the position of the linear sensor in alarm state.

The at least one local request can be sent by each linear sensor and/or accessory periodically according to a time period T.

Sending the local request by the elements of the network can advantageously be periodic. In this case, during a change of linear sensor in the course of maintenance for example, the unique identifiers as well as the specific data items are automatically updated at the next time period T in the central processing unit.

The central processing unit can allocate a simplified identifier to each linear sensor and/or accessory as a function of their unique identifier received.

Advantageously, the central processing unit can create a table comprising the unique identifiers of the elements of the network as well as the specific data items received pertaining to each element of the network. The central processing unit associates a register number to each element according to a MODBUS® protocol, as well as a MODBUS® register address. The central processing unit is configured to associate the unique identifier of a network element to a simplified identifier or "tag" in the table. This makes it possible for the user to sort said table according to the simplified identifier, or also according to the position of the element in the network or by MODBUS® register address for example.

The register number associated with each element in the table by the central processing unit can be set automatically, but also, advantageously, be amended by the user with register numbers unused in the table. This makes it possible to amend the order of the MODBUS® addresses allocated to each element of the network without the need to reprogram the entire table.

According to yet another aspect of the invention, a system is proposed for the implementation of the method according to the invention, the system comprising a central processing unit and a plurality of linear sensors each comprising a first end and a second end and which are connected together to form a detection line, which is connected to said central processing unit by at least one end of said detection line, the system also comprising at least one accessory.

According to yet another aspect of the invention, a computer program product is proposed comprising instructions which, when the program is executed by a computer, cause the latter to implement the steps of the method according to the invention.

BRIEF DESCRIPTION OF THE DRAWINGS

Other advantages and features of the invention will become apparent on reading the detailed description of implementations and embodiments which are in no way limitative, and from the following attached drawings:

FIG. 1 shows a detector of a linear sensor,

FIG. 2 shows a linear sensor,

FIG. 3 shows a diagram of the "self-discovery" method of a network according to the invention, FIG. 4 describes an example embodiment according to the invention.

DETAILED DESCRIPTION

As these embodiments are in no way limitative, variants of the invention can be considered in particular comprising only a selection of characteristics described or illustrated hereinafter, in isolation from the other characteristics described or illustrated, (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

FIG. 1 and FIG. 2 show an example of a formation of a linear sensor that can be used within the context of the invention. However, other types of linear sensors mounted in series can be used within the context of the invention, with all types of detection modes, and all types of communication and/or power supply bus. Linear sensors that differ from one another can also be used together within the context of the invention, provided that their communication buses are compatible with one another and with the central processing unit.

In this example, each linear sensor 500 comprises a detector 200, shown in FIG. 1. This detector 200 comprises a management module 210, which is connected to the proximal end of a detection member 208 extending over the whole length of the linear sensor 500. This detection member 208 forms a bundle that comprises two metallic conductors 106 and 110 and two detection conductors 114, which are electrically connected two by two. The management module 210 measures the electrical properties of the detection conductors 114 by virtue of one of the metallic conductors 106 and 110, called measurement return wire. For detecting a conductive liquid such as for example detection of water acid-base, the resistivity of the detection member reduces during contact with said liquid. For detecting a non-conductive liquid of the hydrocarbon or solvent type for example, the resistivity of the detection member increases during contact with said liquid.

As shown in FIG. 2, in addition to the detector element 200, the linear sensor 500 comprises a communication element that comprises on the one hand two communication conductors 416 and two power supply conductors 424 running over the whole length of the linear sensor 500. At the proximal end of the linear sensor 500, a connector 430 encloses the management module 210. The connector 430 also comprises a communication module 410 and a power supply module 420, which are connected to the communication 416 and power supply 424 conductors and form with them a powered communication bus.

Each linear sensor 500 bears at its distal end a connector 440. The connector 440 comprises connection ports 444 and 446 that allow to connect the distal end of its power supply 424 and communication 416 conductors respectively to the proximal end of another linear sensor of the same type.

The positions of the connectors 430 and 440 are non-limitative. In some embodiments, the connector 440 is positioned on the proximal end of the linear sensor 500 and the connector 430 on the distal end of the linear sensor 500 for example.

With reference to FIG. 3, the "self-discovery" method of a network according to the invention will now be described.

The system or network presented is composed of a central processing unit 8 and four linear sensors 5001 to 5004 installed in series and connected to the central processing unit 8 by one of the ends of the linear sensor 5001. The number of linear sensors is given by way of indication and is therefore non-limitative. The series of linear sensors forms a closed, non-looped detection line. It is closed by an end stop.

When the system starts, each element of the network, i.e. the linear sensors and the end stop in this example, will automatically send a local request RL to the elements located upstream and/or downstream. Sending the local requests RL is done autonomously on startup. By "autonomous" is meant the fact that the local requests are sent without a prior general request from the central processing unit. The different elements can send the local requests one after another or per network segment or also all at the same time for example.

In fact, initially and in the example presented, the linear sensor 5001 identifies the downstream linear sensor 5002, the linear sensor 5002 identifies the upstream linear sensor 5001 and the downstream linear sensor 5003, the linear sensor 5003 identifies the upstream linear sensor 5002 and the downstream linear sensor 5004 and finally the linear sensor 5004 identifies the upstream linear sensor 5003 (referenced ID in FIG. 2).

Secondly, each linear sensor 5001 to 5004 sends a local request RL to the linear sensors that they have each identified by means of the two communication conductors of each linear sensor. The linear sensor 5001 sends a local request RL to the linear sensor 5002, the linear sensor 5002 sends a local request RL to the linear sensors 5001 and 5003, the linear sensor 5003 sends a local request RL to the linear sensors 5002 and 5004, and finally the linear sensor 5004 sends a local request RL to the linear sensor 5003.

The local requests RL are therefore sent in the form of an interrogation signal. The local requests RL received are processed by the management module 210 of each linear sensor 5001 to 5004. All of the linear sensors 5001 to 5004 process the local request RL that they have received and respond to it (reference RRL). The different elements can respond to the local requests one after another or per network segment or also all at the same time for example.

Each detector 200 internal to each linear sensor comprises a unique identifier that makes it possible to identify it. The unique identifier corresponds to the serial number of the detector 200 of each linear sensor for example. When a linear sensor responds to a local request RRL, the latter communicates its unique identifier to the linear sensor that sent the local request RL. For example, the linear sensor 5001 sends its unique identifier in response to the local request RRL of the linear sensor 5002, the linear sensor 5002 sends its unique identifier in response to the linear sensors 5001 and 5003, the linear sensor 5003 sends its unique identifier in response to the linear sensors 5002 and 5004 and finally the sensor 5004 sends its unique identifier in response to the linear sensor 5003.

In a preferred embodiment, the central processing unit 8 sends a general request RG to all of the linear sensors 5001 to 5004 as well as to the end stop so as to obtain all of the unique identifiers of which the network is composed, as well as the unique identifiers identified by the different elements of the network, i.e. the elements located upstream/downstream of the elements and/or that are connected to the different elements. This general request RG will make it possible for the central processing unit to reconstitute the architecture of the network or of the system.

The general request RG is received by each communication module of each linear sensor 5001 to 5004. The general request RG is processed by the management module 210 of each linear sensor. The general request RG is transmitted in the form of an interrogation signal by the central processing unit 8 to the different linear sensors. The number of general requests is unlimited.

The central processing unit 8 sends a general request RG to all of the linear sensors 5001 to 5004 as well as to the end stop. In response to the general request RG sent by the central processing unit 8, each element of the network sends its unique identifier as well as the unique identifier of the elements located upstream/downstream thereof obtained by virtue of the different local requests RL sent during startup of the system.

As a result, each linear sensor transmits its unique identifier to the central processing unit 8 (response to the first general request RRG) as well as the unique identifiers of the linear sensors that they have identified (response to the second general request RRG). For example, in the case presented, in order to respond to the general request RRG, the linear sensor 5001 sends its unique identifier to the central processing unit as well as that of the linear sensor 5002, the linear sensor 5002 sends its unique identifier and the unique identifiers of the linear sensors 5001 and 5003 to the central processing unit 8, the linear sensor 5003 sends its unique identifier to the 10) central processing unit as well as the unique identifiers of the linear sensors 5002 and 5004, and finally the linear sensor 5004 sends its unique identifier to the central processing unit 8 as well as that of the linear sensor 5003. The responses to the general request RRG are transmitted in the form of a response signal to the central processing unit 8.

In this preferred embodiment, the general request RG sent also makes it possible to return to the central processing unit 8 specific data items pertaining to the elements of the network. In this case, each element of the network sends a new local request to the upstream and/or downstream elements. The response to the local request RRL of each linear sensor or accessory such as the end stop then comprises the specific data items demanded by the general request RG that pertain to the different elements of the network. The responses to the different local requests can comprise one or more specific data items. The specific data items are for example:

a date of commissioning of the linear sensor,
the type of linear sensor,
a length of the linear sensor,
a resistance of the loops internal to the linear sensor,
a pollution level,
an alarm state,
a power supply level.

The specific data items are not limited to this list. In other embodiments the specific data items are audit log or sensitivity data items for example.

Each linear sensor comprises a date of commissioning. This specific data item is stored in the management module 210 of said linear sensor for example. The same goes for the type of linear sensor and the length thereof. These specific data items are therefore transmitted to the central processing unit 8 during the steps of responses to a local request RRL or during a response to a general request RRG.

By "loop internal to the linear sensor" in the expression "resistance of the loop internal to the linear sensor" is meant a loop formed by one of the metallic conductors and a measurement return wire in a linear sensor (references 106 and 110 in FIG. 1). The resistance of an internal loop therefore corresponds to the state that it exhibits. In the event that, for example, the metallic conductor or the return wire is cut, damaged, or for any other reason the internal loop is no longer functional, an alarm state of the linear sensor corresponding to a discontinuity alarm is sent to the central processing unit 8 in order to warn the user.

The detection conductors 114 comprise a resistor (not shown in the figures) that makes it possible to define if a break has occurred in the detection member 208. By "a level of pollution" is meant the level of pollution of said resistor of the detection conductors 114. In fact, during the use of a linear sensor, dust may become deposited on the resistor, for example, or the resistor may deteriorate as a result of the environmental conditions in which it is situated. In this case, an alert state of the linear sensor corresponding to a cleaning alert is sent to the central processing unit 8 in order to warn the user for example.

An alarm state is sent if one of the aforementioned conditions occurs. The alarm state is also activated as a function of a sensitivity level of the network. In fact, this sensitivity level is defined as a function of the specific data items of pollution and/or resistance of the internal loops sent to the central processing unit. To this end, a sensitivity threshold is defined beforehand for each linear sensor or for the network as a function of need. For example, the sensitivity threshold is adjusted between one and five if an individual sensitivity threshold is concerned, i.e. pertaining to each linear sensor or to zero if an overall sensitivity threshold for the network is concerned.

In the event that a break or a failure occurs on one of the linear sensors, the latter adopts an alarm state. The management module of said linear sensor in alarm state then transmits this specific data item to the central processing unit in response to the general request RRG or on local request RRL of a linear sensor.

The power supply level of a linear sensor is defined by the power supply module 420. The two power supply conductors 424 are responsible for conveying the power supply over the network. However, the range of the power supply is limited to a certain distance of linear sensors, i.e. a certain cable length. As a result, the power supply level of each linear sensor is transmitted when a general request RG is sent by the central processing unit and/or when a local request RL is sent by one of the linear sensors. In an embodiment, this specific data item is sent on demand to the central processing unit or to an element of the network. In another embodiment, this specific data item can also be sent to the central processing unit by the element, of its own motion, without prior request.

In the event that the central processing unit 8 identifies a linear sensor having a power supply level that is too low, i.e. below a predetermined threshold, an alert state is sent by the management module 210 of the linear sensor in question to the central processing unit 8. The central processing unit 8 then sends a message to the central processing unit so that the user can intervene on the network. For example, if the power supply of the network is equal to twelve volts, the predetermined threshold can be at approximately ten volts—ten and a half volts. The central processing unit can also inform the user that there are too many elements on the loop. The user can then intervene and remove elements or add an external power supply if that is possible.

In an embodiment, all of the specific data items are sent on demand to the central processing unit or to an element of the network. In another embodiment, all of the specific data items can also be sent to the central processing unit by the element, of its own motion, without prior request.

When all the responses to the local requests RRL have been sent and processed by the linear sensors, each linear sensor 5001 to 5004 responds to the general request RRG sent by the central processing unit 8 (reference RRG) in the direction end stop—central processing unit.

In the preferred embodiment presented here, a single general request RG is sent by the central processing unit 8 so as to receive the unique identifiers of each element of the network as well as specific data items allowing for the central processing unit 8 to know for example the type of element forming the network, or its state.

In a second embodiment, the central processing unit 8 sends two separate general requests RG so as to return on the one hand the unique identifiers of each element and on the other hand the specific data items pertaining to each element.

Firstly, during startup of the network, the central processing unit 8 sends a first general request RG to all of the linear sensors 5001 to 5004 so as to obtain the set of unique identifiers comprised in each element of which the network is composed, as well as the unique identifiers identified by the different elements of the network, i.e. the elements located upstream/downstream of the elements and/or that are connected to the different elements. Following this first general request RG, each element of the network, i.e. the linear sensors and the end stop in this example, will automatically send a local request RL to the elements located upstream and/or downstream. In this embodiment, sending the local requests by the elements of the network is not done autonomously but on demand. On the same principle as presented in the preferred embodiment, all of elements of the network respond to the different local requests RL sent. Once all of the local requests RL have been processed, the elements of the network respond to the first general request RG, still according to the same principle as that presented in the preferred embodiment.

Secondly, and if need be, the central processing unit sends a second general request RG so as to obtain the different specific data items pertaining to each element of the network. The specific data items are the same as those presented in the preferred embodiment. Sending the second request operates on the same principle as sending a single general request RG as presented in the preferred embodiment.

The central processing unit 8 then receives all of the responses to the general requests RRG (the first as well as the second) and processes them. The responses to the general requests are therefore adapted to the type of general request sent.

Regardless of the embodiment, the central processing unit 8 collects all of the specific data items sent by the linear sensors of the network by means of the different general request(s) RG and creates a table so as to organize them. The unique identifiers of each linear sensor are stored in said table. A MODBUS® register number is then automatically allocated to each linear sensor in the table as well as a register address.

Still regardless of the embodiment, the at least one local request RL can be sent at a regular interval. The at least one local request is then sent according to a time period and not on demand by the central processing unit 8.

FIG. 4 shows an example embodiment of the invention. In this example, the different requests correspond to interrogation signals. The different responses to the different requests correspond to response signals.

The network is composed of a central processing unit 8 comprising two connectors 81 and 82 connected to a series of linear sensors forming the loop B1 via the connectors of the linear sensors situated at the ends of said series. The loop B1 comprises junction blocks B1N2, B1N3 and B1N6, which receive two series of linear sensors forming secondary loops B2 and B3.

These junction blocks B1N2, B1N3 and B1N6 are formed by an electronic junction module, which is arranged to receive in at least one of its outputs, the connector of one or more linear sensors, potentially but not obligatorily of the same type.

In this example, each of these junction blocks are situated at the level of one of the connectors of a linear sensor. The connector 4302 thus contains a junction block B1N2, the connector 4303 contains a junction block B1N3, and the connector 4306 contains a junction block B1N6.

Within a linear sensor, each of the junction blocks is functionally connected to the communication module 410 of the linear sensor, which transmits thereto the interrogation signals E1, E2 of the different general and local requests RG, RL that it receives, in addition to transmitting them to the adjacent linear sensor. The junction block is arranged to transmit the interrogation signal to a linear sensor connected via a connection box.

Thus, the loop B1 (called primary, or rank 1) bears a junction block called single junction block B1N2, equipped with a first connection box 821 to which is connected one of the ends of a secondary (or rank 2) loop B2.

The loop B1 (called primary, or rank 1) bears a second junction block called single junction block B1N3, equipped with a first connection box 822 to which is connected one of the ends of the secondary (or rank 2) loop B2.

By means of this connection box 821, the junction block B1N2 conveys in the form of first interrogation signals E21 in the loop B2, the first interrogation signals E1 received in the connector 4302 sent via the interrogation port 81 through the linear sensors of the loop B1. The junction block B1N2 is also arranged to receive via its connection box 821 the response signals R21 sent by the linear sensors of the loop B2 in response to the interrogation signals E21, and to convey them into the primary loop B1 in the form of response signals R1. The response signals R21 are transmitted to the interrogation port 81 of the central processing unit that emitted the interrogation signals through the linear sensors of the loop B1.

By means of this connection box 822, the junction block B1N3 conveys in the form of first interrogation signals E22 in the loop B2, the first interrogation signals E2 received in the connector 4303 sent via the interrogation port 82 through the linear sensors of the loop B1. The junction block B1N3 is also arranged to receive via its connection box 822 the response signals R22 sent by the linear sensors of the loop B2 in response 25 to the interrogation signals E22, and to convey them into the primary loop B1 in the form of response signals R2. The response signals R22 are transmitted to the interrogation port 82 of the central processing unit that transmitted the interrogation signals via the linear sensors of the loop B1.

The loop B1 (called primary, or rank 1) also bears a third junction block called double junction block B1N6, equipped with two connection boxes 831 and 832 to which are connected the ends of the secondary (or rank 2) loop B3. This latter operates in the same way as the single junction blocks, save that it combines and manages at the same time a first connection box 831 and a second connection box 832 to which are connected the two ends of a second secondary loop B3 (itself also rank two). Each of these connection boxes 831, 832 transmits thereto first and second interrogation signals E31 and E32, and receives therefrom first and second response signals R31 and R32.

As is understood, the first and second connection boxes of said junction block B1N6 of the loop B1 are seen by the loops B2, B3 in a similar manner to the interrogation ports 81, 82 of the central processing unit 8.

The junction block B1N6 is therefore arranged to receive via its connection box 831 the response signals R31 sent by the linear sensors of the loop B3 in response to the interrogation signals E31, and to convey them into the primary loop B1 in the form of response signals B1 via the linear sensors of the loop B1. The response signals R31 are transmitted to the interrogation port 81 of the central processing unit that transmitted the interrogation signals.

The junction block B1N6 is also arranged to receive via its connection box 822 the response signals R32 sent by the linear sensors of the loop B3 in response to the interrogation signals E32 via the linear sensors of the loop B3, and to convey them into the primary loop B1 in the form of response signals R1 via the linear sensors of the loop B1. The response signals R32 are transmitted to the interrogation port 82 of the central processing unit that transmitted the interrogation signals.

Based on the response signals received from the linear sensors, junction blocks and/or accessories (not comprised in the embodiment described), the central processing unit 8 initiates a network "discovery" function.

It can be seen that it is thus possible to produce numerous topologies, combining loops having different ranks, in a very flexible fashion, both with respect to the zones to be monitored and from the point of view of the modifications to the installation during its lifetime. These advantages are obtained while still benefiting from the redundancy and fault location enabled by the individual operation of each loop, all the information from which finally returns to the central processing unit 8.

This embodiment is given by way of example, numerous embodiments are possible such as for example, a network such as shown in FIG. 4 also comprising level three loops, i.e. a loop B4 on a junction block positioned on the loop B3, and/or, a closed line of linear sensors, i.e. that does not form a loop, a first end of the line being connected to the central processing unit 8 or to a junction block for example, the second end of the line being terminated by an end stop.

Typically, each of the means of the device according to the invention described above can comprise at least a computer, a central processing or calculation unit, an analogue electronic circuit (preferably dedicated), a digital electronic circuit (preferably dedicated), and/or a microprocessor (preferably dedicated) and/or software means.

Of course, the invention is not limited to the examples which have just been described, and numerous adjustments may be made to these examples without departing from the scope of the invention.

Of course, the different characteristics, forms, variants and embodiments of the invention can be combined together in various combinations inasmuch as they are not incompatible or mutually exclusive. In particular, all the variants and embodiments described above can be combined together.

The invention claimed is:

1. A self-discovery method for a network of linear sensors, the network comprising a central processing unit and a plurality of linear sensors each comprising a first end and a second end and which are connected together to form a detection line, which is connected to said central processing unit by at least one end of said detection line, the network also comprising at least one accessory, said accessory comprising at least one output allowing to connect a linear sensor by means of one of the ends of said linear sensor, each linear sensor and/or accessory is characterized by a unique identifier and in that the method comprises at least the following steps:

for each linear sensor and/or accessory:

identifying at least one upstream and/or downstream linear sensor situated upstream and/or downstream of each said linear sensor and/or accessory, the at least one upstream and/or downstream linear sensor being considered as identified if one of its ends is connected to one of the ends of each said linear sensor and/or to the at least one output of the accessory;

sending at least one local request to the at least one upstream and/or downstream linear sensor identified by said linear sensor and/or by the accessory;

sending at least one general request by the central processing unit to the plurality of linear sensors and/or the accessory of the network;

receiving at least one response to the at least one local request by said linear sensor and/or the accessory, the response being composed of the unique identifier of the at least one upstream and/or downstream linear sensor identified by said linear sensor and/or the accessory;

sending at least one response to the general request by said linear sensor and/or by the accessory, the response to the at least one general request sent by the linear sensor comprising the unique identifier of the at least one upstream and/or downstream linear sensor identified by said linear sensor as well as the unique identifier of said linear sensor, and/or, the response to the at least one general request sent by the accessory comprising the unique identifier of the at least one upstream and/or downstream linear sensor identified by said accessory as well as the unique identifier of said accessory; and processing the at least one response to the general request received from each said linear sensor and/or from each accessory by the central processing unit allowing to reconstitute the logical topology of the network as a function of the unique identifiers received.

2. The self-discovery method according to claim 1, characterized in that the accessory corresponds to a junction block and/or an end stop and/or a neutral cable.

3. The self-discovery method according to claim 1, characterized in that the at least one response to the local request and the at least one response to the general request also comprise specific data pertaining to each linear sensor and/or accessory.

4. The self-discovery method according to claim 3, characterized in that the specific data comprise at least one of the following data items:
 a date of commissioning of the linear sensor,
 the type of linear sensor,
 a length of the linear sensor,
 a resistance of the loops internal to the linear sensor,
 a pollution level,
 an alarm state,
 a power supply level.

5. The self-discovery method according to claim 1, characterized in that each linear sensor and/or accessory comprises a power supply module, and characterized in that the method also comprises the following steps:
 if a power supply level of the power supply module of a linear sensor and/or of an accessory is below a determined threshold, an alert is sent to the central processing unit.

6. The self-discovery method according to claim 3, characterized in that the method also comprises the following steps:
 identifying the linear sensor in alarm state on the basis of the specific data items sent by the central processing unit during the response to the general request.

7. The self-discovery method according to claim 1, characterized in that the at least one local request is sent by each linear sensor and/or accessory periodically according to a time period T.

8. The self-discovery method according to claim 1, characterized in that the central processing unit allocates a simplified identifier to each linear sensor and/or accessory as a function of their unique identifier received.

9. A system for the implementation of the method according to claim 1, the system comprising a central processing unit and a plurality of linear sensors each comprising a first end and a second end and which are connected together to form a detection line, which is connected to said central processing unit by at least one end of said detection line, the system also comprising at least one accessory.

10. A non-transitory medium comprising instructions which, when the program is executed by a computer, cause the latter to implement the steps of the method according to claim 1.

* * * * *